United States Patent [19]
Okamoto et al.

[11] 3,950,455
[45] Apr. 13, 1976

[54] METHOD FOR GRAFT POLYMERIZATION OF DIENE POLYMER

[75] Inventors: Takehiko Okamoto, Aichi; Akihiko Kishimoto, Nagoya; Masakazu Inoue, Nagoya; Ikuo Nagai, Nagoya; Mitsunobu Otani, Otsu, all of Japan

[73] Assignee: Toray Industries, Inc., Tokyo, Japan

[22] Filed: June 26, 1974

[21] Appl. No.: 483,107

Related U.S. Application Data

[63] Continuation-in-part of Ser. No. 304,645, Nov. 11, 1972, abandoned, which is a continuation-in-part of Ser. No. 74,721, Sept. 23, 1970, abandoned.

[52] U.S. Cl. .............................. 260/880 R; 260/879
[51] Int. Cl.² ........................................ C08F 291/02
[58] Field of Search .......................... 260/880 R, 879

[56] References Cited
UNITED STATES PATENTS

| | | | |
|---|---|---|---|
| 3,370,105 | 2/1968 | DeBell | 260/880 |
| 3,542,905 | 11/1970 | Nishioka | 260/879 |
| 3,663,655 | 5/1972 | Sturt | 260/875 |
| 3,751,526 | 8/1973 | Okasaka | 260/880 R |

*Primary Examiner*—Christopher A. Henderson, Jr.

[57] ABSTRACT

High impact resistant thermoplastic resins are produced in three steps: (a) graft polymerizing a minor amount of unsaturated monomer onto a major amount of diene type rubber polymer in latex form, (b) mixing the grafted diene type rubber latex with a monomer or monomers, extracting the grafted rubber polymer particles into the monomer phase and separating and discarding the water phase to obtain a grafted rubber polymer particle dispersed monomer solution, and (c) bulk polymerizing the resulting rubber polymer particle dispersed monomer solution.

7 Claims, 3 Drawing Figures

METHOD FOR GRAFT POLYMERIZATION OF DIENE POLYMER

This is a continuation-in-part application of application Serial No. 304,645, filed November 11, 1972 now abandoned, which in turn is a continuation-in-part application of application Serial No. 74,721, filed September 23, 1970 now abandoned, both of common inventorship and assignment herewith.

BACKGROUND OF THE INVENTION

1. Field of the Invention

The present invention relates to a method for producing impact resistant thermoplastic resins, and more in particular, for producing rubber modified impact resistant thermoplastic resins of high quality.

In essence the process comprises (a) emulsion graft polymerizing a minor amount of radical polymerizable mono-unsaturated monomers onto a major amount of diene rubber polymer particles in latex form, thus preventing any substantial aggregation of the rubber polymer particles in subsequent process steps, (b) mixing one or more radical polymerizable mono-unsaturated monomers with the grafted rubber polymer latex, if necessary with a coagulating agent such as salts or acids, extracting the grafted rubber polymer particles into the monomer phase without substantially changing or aggregating the rubber polymer particles in the latex, and separating and discarding the water phase to obtain a grafted rubber polymer particle dispersed monomer solution and then (c) bulk polymerizing the grafted rubber polymer particle dispersed monomer solution.

2. Description of the Prior Art

Generally speaking, rubber-modified impact resistant thermoplastic resins, so called ABS resins, are mainly produced by emulsion polymerization. The ABS resin obtained by conventional emulsion polymerization processes has excellent properties, but in the processes of recovering the polymer from the latex after polymerization, (i.e., in the processes of coagulation, dehydration, and drying) considerable deterioration of quality is encountered. Furthermore, the polymer recovery process is so complicated and troublesome that it is not satisfactory from an economic point of view.

In order to overcome the aforementioned drawbacks, various alternate methods have been devised in the past. One of the typical procedures is as follows.

According to one procedure of the prior art, the dry rubber, without gel, is dissolved into vinyl monomers, and the resulting viscous monomer solution (the rubber polymer is not dispersed but is dissolved homogeneously) is polymerized in bulk until the conversion reaches about 10 to 60%. During the pre-polymerization, according to the progress of polymerization, rubber polymer becomes precipitated and by agitation the precipitated rubber polymer is fixed as dispersed particles of a desired diameter in the monomer solution. (This phenomenon is called phase inversion). This phase inverted monomer solution is next subjected to polymerization such as suspension polymerization or bulk polymerization. This process is quite advantageous economically, because both suspension polymerization and bulk polymerization are quite simple in recovering the polymer from the polymerization system, compared with emulsion polymerization processes. However, the polymer quality is inferior to that obtained by emulsion polymerization processes, especially with respect to impact strength and surface gloss, both of which are essential properties for ABS resins.

For the same purpose, there has heretofore been proposed an improved process combining emulsion polymerization and suspension polymerization, in which water-soluble and oil-soluble initiators are simultaneously employed, in which event emulsion polymerization takes place in the primary polymerization stage, and the stability of the emulsion is destroyed in the course of the polymerization reaction by procedures such as partial coagulation attained by controlled addition of a coagulating agent in the presence of a suspending agent. As an example, reference may be made to Japanese patent publication No. 21073/1968, or the U.S. Pat. to deBell U.S. Pat. No. 3,370,105, granted Feb. 20, 1968. Nevertheless, these processes are still considered unsatisfactory in the following respects: (1) the polymer quality is still deteriorated by contamination from the emulsifier, suspending agent, initiator residue, or coagulating agent used, (2) production cost is still high compared with bulk polymerization, (3) the surface of the end product is inferior compared with that of conventional emulsion polymerized polymers or that of polymers obtained according to this invention.

On the other hand, it has been recognized through past studies on impact resistant resins that the essential properties of an ABS resin, such as its impact strength and surface gloss, have very strong relation to the condition of the rubber polymer particles dispersed in the resin and the state of grafting onto the rubber polymer particles, and moreover, the most desirable state of rubber particles and the state of grafting can be obtained when the rubber is provided in the form of latex.

We have discovered that it is possible to recover rubber polymer particles from latex in such a state that the particle size of the rubber in the latex can be substantially retained, and that it is possible simultaneously to disperse the rubber polymer particles in a mono-unsaturated monomer such as styrene and acrylonitrile to obtain a rubber polymer particle dispersed monomer solution, and that then it becomes possible to produce an impact resistant thermoplastic resin that has an excellent surface gloss directly by bulk polymerization; in this manner it is possible to overcome all the drawbacks of the conventional methods for producing impact resistant thermoplastic resins.

Relating to the methods of recovering polymer particles from latex retaining its particle size substantially and dispersing the polymer particle into monomers, and polymerizing the monomer solution to obtain a polymer particle dispersed resin, a procedure has been proposed rather recently in the United States patent to Sturt U.S. Pat. No. 3,663,655, granted May 16, 1972.

But even by this procedure it is impossible to prepare a particle dispersed monomer solution of a rubber polymer having a glass transition temperature which is below 0° C, which solution enables one to produce rubber modified impact resistant thermoplastic resins, because the polymer latex, the polymer of which has a transition temperature of less than 20° C, cannot be subjected to the extraction step in this procedure. The soft, rubbery polymer latex, having a glass transition temperature below 20° C, cannot be used because the polymer particles in the latex are aggregated or agglomerated when mixed with monomers and passed into the monomer phase. So, in the aforementioned Sturt patent, a hard resinous polymer latex is chosen, such as PVC, polystyrene, styrene-acrylonitrile copolymer or acrylonitrile-polybutadiene-styrene copolymer. When the process according to Sturt is carried out by using an acrylonitrile-polybutadiene-styrene copolymer latex (ABS resin latex), a small amount of rubber polymer may exist in the resulting resin. However, the rubber content in the resulting polymer is too small to produce a rubber modified impact resistant thermoplastic resin.

Generally speaking, in ABS resin the rubber polymer exists only in a minor amount, say, 10 – 25% based upon the weight of the total polymer. On the other hand, the latex polymer/monomer ratio in the resulting polymer dispersed monomer solution is restricted to less than about 25% in order to conduct the next polymerization step. Therefore, the resulting resin contains only a very small amount of the rubber component, at most 7%, and has very poor impact strength such as 5 kg.cm/cm notched Izod impact strength.

The purpose of this invention is to obtain a method for dispersing a rubber polymer particle of which the glass transition temperature is below 0°C, retaining the substantial latex particle size, into a mono-unsaturated monomer so as to obtain a rubber polymer particle dispersed monomer solution of which the rubber polymer content is high enough (up to 35% by weight) to give a very high impact resistance and excellent surface gloss by polymerizing the rubber polymer dispersed monomer solution.

And, moreover, in the process of the present invention the same merits both in polymer quality and in economy can be realized because the polymer recovery process is quite simple in bulk polymerization compared with emulsion or suspension polymerization, and the state of the grafted rubber particles dispersed in the resulting ABS resin is also the same as that of the ABS produced by conventional emulsion polymerization processes.

SUMMARY OF THE INVENTION

The present invention relates to a method for producing a rubber modified impact resistant thermoplastic resin comprising (1) emulsion graft polymerizing a minor amount of one or more monomers selected from the group consisting of mono-unsaturated monomers represented by the following general formulae:

onto a major amount of a diene rubber polymer of which the glass transition temperature is below 0° C in latex form, (2) mixing the resulting grafted rubber polymer latex with an unsaturated monomer or a mixture of monomers selected from the group consisting of mono-unsaturated monomers represented by the general formulae:

and extracting the grafted rubber polymer particles from said grafted rubber polymer latex into said monomer or mixture of monomers to obtain two phases, one being a monomer phase, in which the grafted rubber polymer particles are dispersed in said monomer or mixture of monomers retaining substantially the same polymer particle size in latex, and the other being a water phase, and then taking off said water phase to obtain a grafted rubber polymer particle dispersed monomer solution, wherein $R_1$ is —H, or —CH$_3$, —R$_2$ is —H, an alkyl group of $C_1$ - $C_3$ or —Cl, $R_3$ is —H or —CH$_3$, $R_4$ is —H, or —CH$_3$, $R_5$ is —H or alkyl group of $C_1$ - $C_5$ in the general formulae, and then (3) polymerizing the grafted rubber polymer particle dispersed monomer solution in bulk polymerization.

DESCRIPTION OF PREFERRED EMBODIMENT

The term "diene rubber polymer" used in this specification means a homopolymer or a copolymer which is composed of more than 60% by weight of conjugated diene monomer and less than 40% by weight of one or more copolymerizable mono-unsaturated monomers.

The glass transition temperature of the diene rubber polymer should be substantially below 0° C to obtain a very high impact resistance in the finished resin in this invention. The conjugated diene monomer can be represented by the following general formula:

wherein $R_6$ is —H, —CH$_3$, or —Cl. The copolymerizable mono-unsaturated monomer is selected from the group represented by the general formulae:

wherein $R_1$ is —H, or —CH$_3$, $R_2$ is —H, alkyl group of $C_1$ - $C_3$, or —Cl, $R_3$ is —H, or —CH$_3$, $R_4$ is —H, or —CH$_3$, $R_5$ is —H, or alkyl group of $C_1$ - $C_5$.

The diene rubber polymer latex in this invention, butadiene-styrene copolymer, butadiene-acrylonitrile copolymer, butadiene-methyl methacrylate copolymer, butadiene-styrene-acrylonitrile copolymer, etc.

There is no special restriction on the particle size of the above mentioned latexes but when higher impact resistance is required, it is preferable to use a latex whose particle size is above about 0.15 microns.

There is no special restriction on the gel content contained in the rubber, but in view of the physical properties, especially surface gloss, of the final products, it is preferred that more than 30% by weight of gel shall be present in the rubber component.

The term "mono-unsaturated monomer" used in emulsion graft polymerization includes (I) aromatic mono-unsaturated monomers represented by the general formula:

wherein $R_1$ is —H, or —$CH_3$, $R_2$ is —H, —Cl, alkyl group of $C_1$ – $C_3$, for example styrene, α-methystyrene, vinyltoluene, chlorostyrene, etc., and mono-unsaturated monomers represented by the general formulae wherein $R_3$ is —H, —$CH_3$, $R_4$ is —H, —$CH_3$, $R_5$ is —H, or alkyl group of $C_1$ – $C_5$, for example acrylonitrile, methyl methacrylate, butyl acrylate, or methacrylonitrile, etc.

The resin phase of the final impact resistant polymer in the present invention is preferably composed of a monomer or monomers in the following ratio:

| | |
|---|---|
| monomer (I) | 0 – 80% by weight |
| monomer (II) | 0 – 35% by weight |
| monomer (III) | 0 – 100% by weight | wherein the total amount of the monomers (I), (II) and (III) is 100% by weight, therefore the amount of each unsaturated monomer used during the process steps of the present invention is preferably in the above range.

The following is a detailed explanation of the respective process steps of the present invention:

1. The charge ratio to be use in the emulsion graft polymerization is from about 99 to 50 parts by weight (solid portion) of diene rubber polymer latex, to from about 1 to 50 parts by weight of mono-unsaturated monomer, or preferably from about 95 to 60 parts by weight of diene rubber polymer latex (solid portion), to from about 5 to 40 parts by weight of mono-unsaturated monomer.

In regard to the graft polymerization of this process step, it is not always necessary that the mono-unsaturated monomer should be bonded chemically to the diene rubber polymer particles but if only the mono-unsaturated monomer is polymerized on the surface of the diene rubber polymer particles, the dispersing stability of the rubber particles after having been dispersed in the unsaturated monomer can be effectively enhanced.

When the proportion of the diene rubber polymer is more than 99% by weight, based on the total weight of the polymer and monomer, the rubber polymer particles cannot effectively be preserved and prevented from aggregation or agglomeration in the monomer solution.

On the other hand, when the proportion of the diene rubber polymer is less than 50 parts by weight, the diene rubber polymer is grafted to such an extreme extent that the latex polymer particle becomes resinous rather than rubbery, that is, the glass transition temperature of the latex polymer particles cannot be said to be below 0° C. And moreover, the content of the latex diene rubber polymer in the resulting graft polymer particle dispersed monomer solution becomes decreased to such an extent that the impact strength of the final product resin becomes poor. In short, it is very important and essential in accordance with the present invention that the rubber properties should be maintained without any substantial change after emulsion graft polymerization, that is, the glass transition temperature should be maintained at most 0° C even after the emulsion graft polymerization. For accomplishing the purpose the graft ratio of monomer to rubber polymer is determined to be within the aforesaid range.

The emulsion graft polymerization process in this invention does not require any unusual reaction condition. As emulsifiers, usual anion emulsifiers such as alkali metal salts of higher aliphatic acids, resin acids, for example sodium stearate, sodium laurate, disproportionated rosin soap, nonionic emulsifiers or cationic emulsifiers may be employed according to the demand. As for initiators, all the emulsion polymerization initiators can be used. The typical initiators are persulphates such as potassium persulphate or ammonium persulphate, redox type initiators such as dextrose-ferrous sulphate-organic hydroperoxide, sulfoxylate-ferrous sulphate-organic hydroperoxide, etc.

With any other ingredient mercaptans, halogenated hydrocarbons, or any other chain transfer agents can be used for controlling the polymer chain length and, grafting reaction. The polymerization temperature should be between 0° to 150° C.

2. The resulting grafted rubber polymer latex is subjected to the next step in which the grafted rubber polymer particles of the latex are extracted into a monomer solution so that the particle size of the grafted rubber polymer is substantially retained and the grafted rubber polymer particles in the unsaturated monomer are dispersed in the monomer without aggregation or agglomeration.

In this second process step one or more mono-unsaturated radical polymerizable monomers which have intimate affinity for the monomers used in the first process step, emulsion graft polymerization, are mixed with the grafted rubber polymer latex and the mixture is stirred thoroughly, if necessary, with coagulating agent. By this operation the grafted rubber polymer particles are extracted from the latex into the monomer separating the water in the latex to form two phases, one being the grafted rubber polymer particle dispersed in the monomer solution, the other being the separated water phase. Then the water layer is removed by using any appropriate mechanical separating technique such as centrifuging, filtering, or squeezing to obtain the grafted rubber polymer dispersed monomer solution. The ratio of the latex polymer to the extraction monomer can be changed according to the demand which comes from the water separation condition. If the quantity of monomer used in the extraction is relatively small, for instance, if the ratio of latex polymer to extraction monomer is about 1 to 1, the resulting graft rubber polymer particle dispersed monomer solution becomes extremely viscous and appears somewhat crumb-like, then squeezing can be adopted for water separation. It the excess monomer is used for the extraction, the resulting graft rubber polymer particle dispersed monomer solution becomes fluid and centrifuging or decantation are the most preferable separation techniques. Unsaturated monomer or mixtures of monomers which are the same kind of monomers used in the first emulsion graft polymerization process step are preferably used in this extraction process step, for reasons which will appear in further detail hereinafter.

Generally speaking, in order to obtain a very high impact resistant property in a rubber modified impact resistant resin, it is essentially important that rubber polymer particles, having a glass transition temperature as low as possible, should be dispersed in the most appropriate particle size and in the most appropriate grafting state. On the other hand, the most appropriate rubber polymer particle size is just that of the latex. And the latex of the rubber polymer of which the glass transition temperature is low enough to be used for production of a very high impact resistance resin, e.g. polybutadiene latex, or butadiene-styrene copolymer latex, is commercially available. Therefore, it is most desirable if the rubber polymer particles such as polybutadiene particles and butadiene-styrene copolymer particles are directly extracted into monomers substantially retaining the latex particle size, but it is impossible because the rubber polymer particles are deformed or aggregated or agglomerated or dissolved in the monomer solution during the extraction process step or the next polymerization process step. In this invention, it has been discovered that if a diene rubber polymer latex is used for this extraction process step, on which polymer particle a minor amount of mono-unsaturated monomer is polymerized, and a monomer having solubility in the grafted monomer is used for extracting the grafted rubber polymer particles, then deformation or aggregation or agglomeration or destruction of the rubber polymer particles can be prevented. The result is highly effective.

The affinity or solubility of the extraction monomer for or in the grafted monomer is quite essential to accomplish the purpose. Therefore, the choice of the extraction monomer should be made very carefully, considering such affinity or solubility.

The above mentioned mono-unsaturated monomers represented by the formulae (I), (II) and (III) can be used in this process step.

There is not any other special technical restriction, other than the affinity or solubility matter just referred to, but it is preferable to choose a monomer or mixture of monomers which are insoluble or difficultly soluble in water, because the efficiency of the extraction step depends considerably upon the solubility of the extraction monomer in water. From this point of view, styrene or a derivative is the most desirable extraction monomer. The grafted rubber polymer particle dispersed monomer solution can be mixed with other monomers after separation of the water to form a final monomer solution. Even in this case it can also be said that the monomers in the final grafted rubber polymer particle dispersed monomer solution should be preferably selected so that the monomer ratio falls within the range of about 0 – 80% by weight of monomer (I), about 0 – 35% by weight of monomer (II), and about 0 – 100% by weight of monomer (III), wherein the total of the three monomers is 100% by weight.

The amount of the unsaturated monomer used in this extraction step is not strictly limited. However, in order to increase the efficiency of extraction and dehydration in this second process step, it is preferable to use from about 50 to 400 parts by weight of mono-unsaturated monomer based on 100 parts by weight of the grafted rubber polymer.

In regard to the temperature under which extraction is carried out, it is preferable to employ a temperature of from about 0° to 50° C, in view of possible polymerization of the monomer, and solubility of monomer in the water, and the danger of coagulation of the grafted rubber polymer latex itself.

The water layer separated from the mixture is removed by a conventional method, for instance, decantation, centrifuge, filtration, or squeezing.

The resulting graft rubber polymer particle dispersed monomer solution is controlled, if necessary, by adding monomers, to obtain a diene rubber polymer content of about 5 to 35% preferably about 7 to 35% by weight of total grafted rubber polymer particle dispersed monomer solution.

In regard to the agents for inactivating the emulsifier in the latex, there is no special restriction about the kind and quantity. These agents are so-called coagulating agents and accelerate the extraction efficiency. Inorganic salt or acids can be used for this purpose. Typical agents are magnesium sulfate, sodium chloride, and the like, electrolytes, sulphuric acid, acetic acid, etc.

3. In the third process step, bulk polymerization is carried out thermally or catalytically by using the resulting graft rubber polymer particle dispersed monomer solution. There is no special restriction on the selection of the catalyst, but ordinary organic peroxides or azo compounds can be used. When the polymerization catalyst is used the polymerication is carried out at temperatures ranging from about 50° to 200° C. When the polymerization is carried out thermally without any catalyst, the appropriate temperature is from about 70° to 250° C. During the polymerization process step, the grafted rubber polymer particle dispersed in the monomer is maintained substantially at the same particle size as that of the latex without deformation or destruction or aggregation or agglomeration of the diene rubber polymer, but chemically the mono-unsaturated monomers are grafted to the diene polymer particles to provide the most desirable grafting state so that the final product resin has the most desired high impact strength. Sometimes more or less water remains in the grafted rubber polymer particle dispersed monomer solution, but if the water content is so small that the water is dissolved or suspended as small particles in the monomer phase, it does not present any difficulty in the polymerization process. On the contrary, the presence of a small amount of water is advantageous for bulk polymerization, because if the water is vaporized during polymerization, the latent heat of vaporization of the water which is far greater than that of the monomers can be utilized for removing the heat of polymerization which is otherwise difficult to remove. When the method of the present invention is carried out on an industrial scale, it is convenient to carry out the polymerization reaction in such a manner that the grafted rubber polymer particle dispersed monomer solution is directly supplied into a continuous type of reactor, and the polymerization temperature is maintained at from about 70° to 250° C to effect thermal polymerization. The reaction temperature is maintained at a value from about 70° to 150° C at the inlet of the reactor and the temperature gradient is maintained along the flow in the reactor toward the outlet. The polymerization temperature is adjusted to about 170° to 270° C at the outlet of the reactor where the polymerization is terminated and the polymer product is taken out in a molten state. If necessary, the remaining water in the grafted rubber polymer particle dispersed monomer solution is removed from the polymerization system during the polymerization by vaporizing the monomer and the water azeotropically out of the reactor and condensing the vapor into liquid to separate into two phases, the monomer layer and the water layer, pumping back the monomer layer into the reactor and discarding the water from the polymerization system.

The product polymer, if it is desired, is blended and mixed with additives or other polymers and the residual monomer and volatile material is removed.

In order to obtain high impact resistance in the product polymer it is indispensable that the diene rubber polymer particles are dispersed in the final product resin retaining substantially the same particle size as was in the latex, and that the diene rubber polymer particles are grafted in the most appropriate state. In the present invention, the first process step virtually prevents the destruction or deformation or aggregation of the diene rubber polymer particles in advance unless it otherwise should occur in the next second and third process step. And the third process step, the bulk polymerization is the best polymerization process both to control the grafting reaction to the most desired state, an to obtain the best economical merit.

Figure 1:
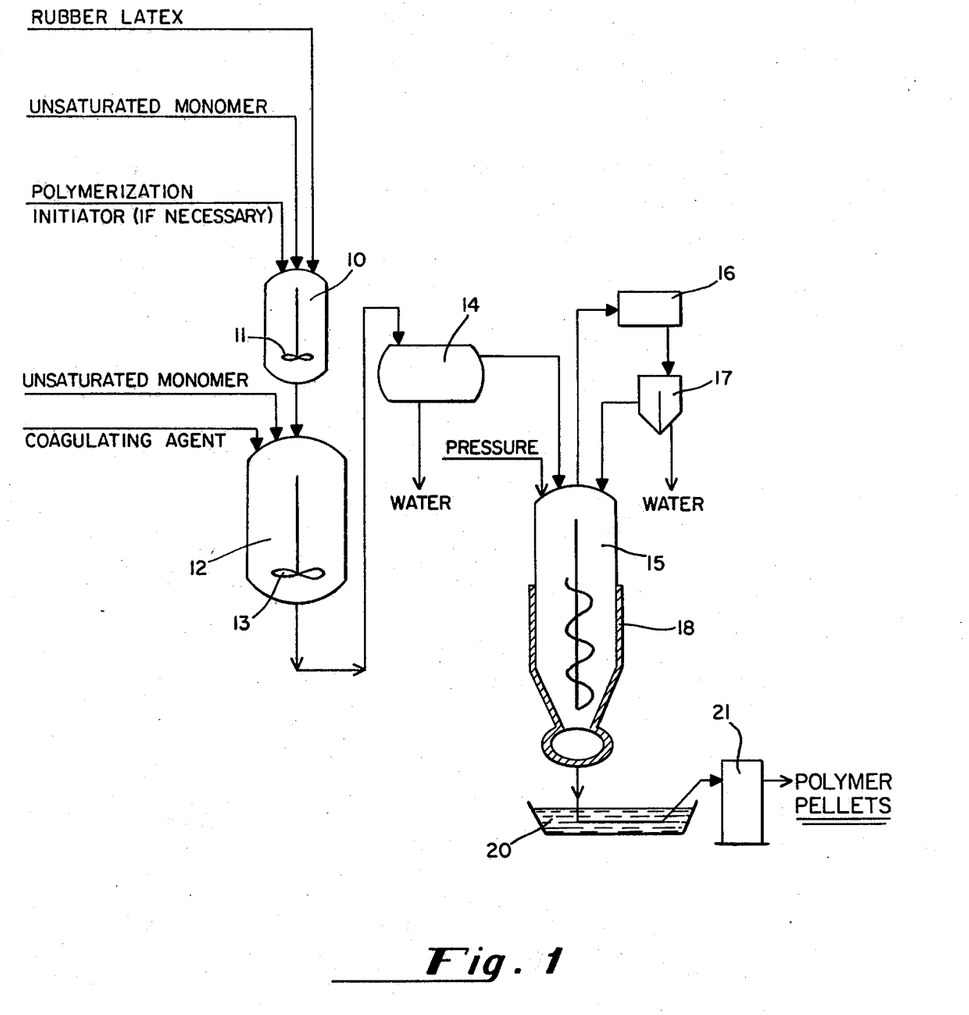
FIG. 1 is a typical flow diagram showing an embodiment in which the method of the present invention is carried out.

An embodiment in which the method of the present invention is worked out on an industrial scale is shown in FIG. 1 of the drawings. In the following paragraphs an embodiment of the present invention on an industrial scale is described with reference to the flow sheet.

A predetermined amount of diene rubber polymer latex, unsaturated monomer and initiator and other ingredients are charged into an emulsion graft polymerization vessel 10 equipped with stirrer 11, and emulsion graft polymerization is carried out at a predetermined temperature for a predetermined period, and the resulting grafted rubber polymer latex is supplied from the polymerization vessel to a mixer 12 equipped with stirrer 13.

Unsaturated monomer, if necessary with coagulating agent, is introduced into the mixer 12, and stirred.

Thus, the grafted rubber polymer latex and the unsaturated monomer are completely mixed to result in the extraction of the grafted rubber polymer particle from the latex into the unsaturated monomer by virtue of the affinity between the grafted rubber polymer and the unsaturated monomer, to form two separate phases, one being the organic phase which is the grafted rubber polymer particle dispersed monomer solution, the other being water.

Next, the two layer mixture is introduced into the separator 14 to remove the water phase. The separator 14 is of a mechanical separation type, and is connected to the inlet of the next bulk polymerization vessel 15.

The bulk polymerization vessel 15 is of such construction as to evaporate and reflux the unsaturated monomer to remove the reaction heat generated by the polymerization reaction, and the polymerization temperature is controlled by utilizing the latent heat of vaporization of the evaporated monomer. Water residue which is not removed in the second process step is removed from the polymerization system during the polymerization utilizing the monomer water reflux by using the condenser 16 and the water separator 17.

When such a polymerization temperature controlling method is adopted, it is preferable to supply an extra quantity of unsaturated monomer to the bulk polymerization vessel in the third process step. In such case the extra monomer may be removed through the condenser 16 in order to obtain a resin containing from about 5 to 35% by weight of diene rubber component.

When the polymerization terminates near the outlet of the polymerization vessel, the polymer is in a molten state and it is immediately extruded out by polymerization vessel into the cooling bath 20.

The bulk polymerization vessel can be kept at an appropriate temperature by heating from the inside or outside of the vessel.

Since a stirring operation is required in the polymerization vessel during the polymerization, the stirring blade used in the vessel is preferably of such a structure that the stirring operation of the bulk polymerization system can be carried out suitably.

The polymer is extruded under high pressure, and therefore the bulk polymerization vessel 15 should be of a structure capable of resisting high pressure.

The extruded gut of polymer is cooled off and solidified, and cut into pellet form by cutter 21 and the pellets can be directly subjected to injection molding or extrusion molding.

According to the present invention is becomes possible to replace the most troublesome and expensive process step in the conventional emulsion polymerization process, (i.e., coagulation, dehydration, drying and extrusion) with two simple process steps, i.e., extraction and separation. In this way we obtain the same excellent physical strength and surface gloss which we have heretofore been able to obtain by only conventional emulsion polymerization processes.

Furthermore, since the coagulating agents or emulsifiers which seriously degrade the properties of the product resin are not present in such great quantities, compared with conventional emulsion polymerization processes, we do not experience undesirable coloring or degradation in the final product resin.

Further, according to the present invention it becomes possible to disperse the rubber polymer particles (in which the glass transition temperature is low enough to obtain a high impact strength in the final product) in the resinous polymer in the most appropriate particle size, i.e. the existing latex particle size, which is invaluable in obtaining a high impact strength in the final product. Accordingly, the rubber polymer content in the final product may be increased, say, up to about 35% by weight of the final product resin, so that a very high impact strength can be obtained in the final product resin. This has been believed to be impossible according to the prior art proposed before this invention was made.

Therefore, the method of the present invention is very advantageous and unique from an industrial standpoint.

The following examples illustrate the method of this invention; they are not intended to restrict the scope of this invention.

In the following examples various measurements were made in the following manner:

MELT VISCOSITY

This was calculated as Newtonian flow by extruding the polymer sample from a capillary tube (1 mm length × 0.5 mmϕ) at 220°C under pressure of 50 kg/cm$^2$.

TENSILE STRENGTH AT YIELD

Tensile strength at yield was measured in accordance with ASTM-D638-61T. (Unit: kg/cm)

TENSILE STRENGTH AT BREAK

Tensile strength at break was measured in accordance with ASTM-D638-61T. (Unit: kg/cm)

ELONGATION AT YIELD

Elongation at yield was measured in accordance with ASTM-D638-61T. (Unit: %)

ELONGATION AT BREAK

Elongation at break was measured in accordance with ASTM-D638-61T. (Unit: %)

IZOD IMPACT STRENGTH

Izod impact strength was measured in accordance with Method A of ASTM-D-256-56. (Unit: kg.cm/cm notch)

ELECTRON MICROSCOPIC PHOTOGRAPH

Resins were treated with osmic acid to fix the rubber component and cut into extremely thin section by an ultramicrotome, and photographs were taken using an electron microscope.

LIGHT PERMEABILITY

Light permeability was measured in accordance with ASTM-D-1003. (Unit: %)

EXAMPLE 1

Styrene and acrylonitrile was emulsion graft polymerized in the presence of polybutadiene latex (Firestone Co., Ltd. FRS-2004, average particle size 0.25% $\mu$) according to the following polymerization recipe to obtain a graft polymer latex.

The polymerization was carried out in a glass reaction vessel equipped with a stirrer under nitrogen gas at 65° C for 5 hours.

The conversion rate was 95%. The formulation used in the polymerization was as follows:

| MATERIAL | CHARGED AMOUNT (parts) |
|---|---|
| Polybutadiene latex (solid portion) | 60.0 |
| Styrene | 28.0 |
| Acrylonitrile | 12.0 |
| Tert-dodecylmercaptan | 0.15 |
| Sodium laurate | 1.50 |
| Dextrose | 0.5 |
| Cumenehydroxide | 0.2 |
| Sodium pyrophosphate | 0.3 |
| Ferrous sulfate | 0.01 |
| Deionized water | 150.0 |

49 parts by weight of styrene and 21 parts by weight acrylonitrile were added to 30 parts by weight of the solid portion of the latex thus obtained and the resulting mixture was stirred. Thereafter 3 parts by weight of magnesium sulfate were added and stirred for 15 minutes.

After having stopped the stirring operation, the mixture divided into a grafted rubber polymer particle dispersed monomer solution phase (the upper layer) and water phase (the lower layer), 30 minutes after the termination of the stirring operation.

The water in the lower layer was removed, and 0.2 part of tert-dodecylmercaptan, 0.3 part of azobisisobutyronitrile (AIBN) were added to the grafted rubber polymer particle dispersed monomer solution, and the mixture was uniformly mixed, and then the resulting mixture was charged into a glass vessel. The vapor phase in the vessel was replaced with nitrogen gas, and then the mixture was subjected to polymerization at 50° C for 24 hours. The polymerization was then terminated.

The glass vessel was broken and the polymer was recovered. It was a white polymer. It was crushed and 1% by weight of a phenol type stabilizer based on the amount of the polymer was added.

The resulting product was injection molded, and its physical properties were examined, and it was found to be a thermoplastic resin having excellent impact resistance, capable of being injection molded.

It had the following properties:

Melt viscosity (220° C; 0.5 mm × 1 mm nozzle; 50 kg/cm$^2$) = 4.0×10$^3$ poise

Tensile yield strength = 410 kg/cm$^2$

Elongation at break = 18%

Izod impact strength = 20 kg.cm/cm notch

Figure 2:
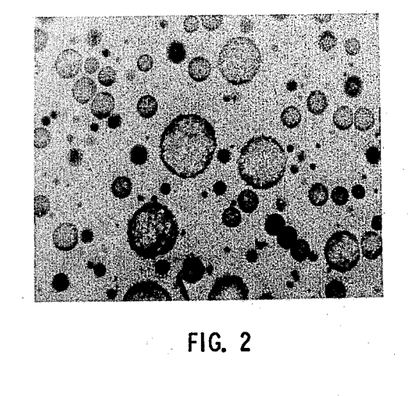
FIG. 2 is an electron-micro photograph (magnification 15,000) showing the cross-section of an ultra thin piece of the resin obtained in Example 1, in which rubber particles are independently dispersed.

An extremely thin piece of resin, obtained as predescribed, was observed and photographed through an electron microscope, and the resulting photograph is shown in FIG. 2 of the drawing. As will be apparent, the rubber particles were independently and uniformly dispersed.

CONTROL EXAMPLE 1 a. The grafted rubber polymer latex, obtained by using the emulsion polymerization as in Example 1, was coagulated with magnesium sulfate and thereafter dehydration and drying operations were carried out thereon. 30 parts by weight of polymer powder were obtained.

b. On the other hand, 49 parts by weight of styrene and 21 parts by weight of acrylonitrile were polymerized, using 1.5 parts by weight of sodium laurate as the emulsifier, 0.2 part by weight of potassium persulfate as the polymerization initiator, along with 150 parts by weight of water and 0.4 part by weight of tert-dodecylmercaptan at 65° C. The polymer obtained was coagulated with magnesium sulfate, and dehydration and drying operations were carried out to produce a resin powder.

1.0 part by weight of phenol type stabilizer was added to (a) and (b) and the mixture obtained was kneaded in an extruder and pelletized to produce resin pellets.

The physical properties of the resulting polymer were measured with the following results:

Melt viscosity (220° C; 0.5 mm$\phi$ nozzle; 50 kg/cm$^2$) = 4.5 × 10$^3$ poise

Tensile yield strength = 400 kg/cm$^2$

Elongation at break = 8%

Izod impact strength = 6 kg.cm/cm notch

When compared with Example 1, the polymer had poor impact strength.

EXAMPLE 2

A butadiene-styrene-acrylonitrile graft copolymer latex, having a polybutadiene latex as its principal base, was prepared in the same manner as in Example 1. The materials used were as follows:

| MATERIAL | CHARGED AMOUNT (parts) |
|---|---|
| Polybutadiene latex (solid portion) | 80.0 |
| Styrene | 14.0 |
| Acrylonitrile | 6.0 |
| Tert-dodecylmercaptan | 0.05 |
| Potassium persulfate | 0.3 |
| Disproportinated rosin soap | 1.0 |
| Deionized water | 150.0 |

The polymerization was carried out at 70° C in a nitrogen gas stream for 6 hours.

56 parts by weight of styrene were added to 20 parts by weight of the grafted rubber polymer latex solid portion obtained, and the mixture was stirred, then 1 part by weight of sulfuric acid was added thereto, and a stirring operation was carried out for 30 minutes.

The mixture obtained was subjected to centrifugal separation. It divided into the upper layer of grafted rubber polymer particle dispersed monomer solution phase, and a lower layer of water phase. The water of the lower layer was removed, and the upper layer containing grafted rubber polymer particle dispersed monomer solution along was taken out.

24 parts by weight of acrylonitrile and 0.1 part by weight of tert-dodecylmercaptan and 1 part by weight of phenol type stabilizer were added thereto, and the mixture obtained was charged into a polymerization vessel.

The vapor in the polymerization vessel was replaced with nitrogen gas, and polymerization carried out at 100° C for 8 hours with stirring.

The monomer water mixture solution which evaporated was introduced into a condenser attached to the polymerization vessel during the polymerization procedure, and it was condensed, and thereafter the water was separated from the monomer, and the monomer alone was refluxed into the polymerization vessel.

Thereafter, the polymerization procedure was carried out at 140° C for 4 hours, the reaction temperature was raised to 200° C in 1 hour to terminate the polymerization, and at the same time the polymer was melted.

Figure 3:
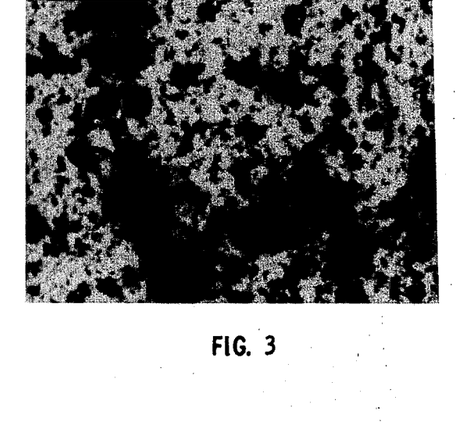
FIG. 3 is an optical micro photograph (magnification 1,200) showing a cross-section of a piece of the resin obtained in Control Example 1.

The polymer was extruded in the form of elongated cylindrical strands, which were cut to form pellets. The polymer obtained was a light yellow resin. Its physical properties were examined, and it was an excellent resin having the following properties:

Melt viscosity (220° C nozzle 0.5 mm × 1 mm; 50 kg/cm) = $3.6 \times 10^3$ poise
Tensile yield strength = 430 kg/cm$^2$
Elongation at break = 16%
Izod impact strength = 18 kg.cm/cm notch The resin was observed with an electron microscope as is shown in FIG. 3.

CONTROL EXAMPLE 2

The grafted rubber polymer latex obtained in Example 2 was coagulated, dehydrated and dried in the same manner as in Control Example 1, and 20 parts by weight of the powder of the grafted rubber polymer were obtained.

On the other hand, 56 parts by weight of styrene and 24 parts by weight of acrylonitrile were separately subjected to emulsion polymerization, and the resin powder thus obtained was mixed with the above obtained grafted rubber polymer powder. The physical properties of the resin thus obtained were measured, with the following results:

Tensile yield strength = 380 kg/cm$^2$
Elongation at break = 7.5%
Izod impact strength (with notch) = 7.8 kg.cm/cm notch Thus when compared with the results of Example 2, the properties of the resin obtained in this control were inferior.

EXAMPLE 3

Methyl methacrylate and styrene were emulsion graft polymerized along with polybutadiene latex in accordance with the following polymerization formulation:

| MATERIAL | CHARGED AMOUNT (parts) |
|---|---|
| Polybutadiene latex (particle size = 0.2μ) (Solid portion) | 50.0 |
| Methyl methacrylate | 38.0 |
| Styrene | 12.0 |
| Sodium formaldehyde sulfoxylate | 0.3 |
| EDTA-4Na salt | 0.1 |
| Ferrous sulfate | 0.01 |
| Cumene hydroperoxide | 1.5 |
| Ion exchange water | 150.0 |
| Polymerization temperature | 60° C |
| Polymerization time | 6 hours |

A monomer mixture of styrene/methyl methacrylate = 24/76 was added to a grafted rubber polymer latex obtained in accordance with the formulation as is shown in the following table, and the mixture obtained was stirred, and 1% by weight of acrylic acid was added to the latex solid portion. After having stirred the mixture, the mixture obtained was subjected to centrifugal separation, and the water and grafted rubber polymer particle dispersed monomer solution was separated.

| LATEX SOLID PORTION (weight parts) | | PARTS OF MONOMER |
|---|---|---|
| No. 1 | 20 | 80 |
| No. 2 | 30 | 70 |
| No. 3 | 40 | 60 |
| No. 4 | 50 | 50 |

0.3 part by weight of azobisisobutyronitrile, 0.2 part by weight of tert-dodecylmercaptan and 0.5 part by weight of methylene bisstearoamide were added to 100 parts by weight of grafted rubber polymer particle dispersed monomer solution, and the mixture was uniformly stirred. Thereafter the mixture was charged into a glass vellel in the same manner as in Example 1, and polymerization was carried out at 50° C in a nitrogen atmosphere for 20 hours.

The resulting resin was transparent and had excellent impact strength and was well adapted for injection molding.

The physical properties of the resin obtained are as follows:

|  | MELT VISCOSITY (×10³ poise) 220° C/0.5 mmφ × 21 mm/50 kg/cm | TENSILE YIELD STRENGTH (kg/cm²) | ELONGATION AT BREAK (%) | IZOD IMPACT STRENGTH (kg. cm/cm notch) |
| --- | --- | --- | --- | --- |
| No. 1 | 4.0 | 500 | 11 | 8 |
| No. 2 | 4.2 | 430 | 16 | 14 |
| No. 3 | 5.0 | 380 | 20 | 20 |
| No. 4 | 5.0 | 350 | 25 | 26 |

EXAMPLE 4

A graft rubber polymer latex was obtained using a glass lined reaction vessel in the following manner.

In accordance with the formulation given below, a polybutadiene latex, a mixture of styrene-acrylonitrile, tert-dodecylmercaptan, a dextrose/sodium pyrrolinate solution, a cumene hydroperoxide/sodium pyrrolinate solution and a ferrous sulfate aqueous solution were continuously supplied to the glass lined reaction vessel at 65° C in a nitrogen atmosphere. On the other hand, a latex of which the conversion was about 90% was continuously taken out the bottom outlet of the glass vessel.

| MATERIAL | CHARGED AMOUNT (parts) |
| --- | --- |
| Polybutadiene latex (particle size 0.25μ) (solid portion) | 65.0 |
| Styrene | 25.0 |
| Acrylonitrile | 10.0 |
| Tert-dodecylmercaptan | 0.2 |
| Dextrose | 0.7 |
| Sodium pyrophosphate | 0.3 |
| Cumene hydroperoxide | 0.2 |
| Ferrous sulfate | 0.01 |
| Sodium laurate | 1.5 |
| Deionized water | 150.0 |

The latex obtained was continuously supplied into another stirring vessel and styrene and acrylonitrile were continuously supplied in the following amounts:

| Graft rubber polymer latex (solid portion) | 25 parts |
| Styrene | 53 parts |
| Acrylonitrile | 22 parts |

3 parts of magnesium sulfate were added to the mixture prepared as above, and the mixture was continuously removed into a water phase and a grafted rubber polymer particle dispersed monomer solution phase, and the water was removed. The grafted rubber polymer particle dispersed monomer solution alone was taken out continuously.

0.1 part by weight of tert-dodecylmercaptan was added to 100 parts by weight of a grafted rubber polymer particle dispersed monomer solution, and then the mixture was continuously supplied into the next polymerization vessel.

The temperature at the inlet of the reaction vessel was kept at about 100° C, and while the polymerization was carried out, the monomer water was evaporated by means of the heat of the polymerization reaction. The latent heat of evaporation was retrieved by condensation in a condenser, and the monomer and water were separated and the water was removed from the reaction system, and monomer alone was refluxed in the reactor.

As the polymerization was carried out, the temperature of the reaction system was raised, and the polymerization was completed at the outlet of the reaction vessel, and the temperature was maintained at about 200° C at which temperature the polymer melted. The polymer was continuously removed in the form of gut, and the polymer obtained was cut into pellets with a cutter. The polymer was milky white, and was a thermoplastic resin having excellent impact strength and excellent processability. The physical properties of the resin product were as follows:

Melt viscosity (220° C, 0.5 mmφ × 1 mm nozzle, 50 kg/cm²) = 3.0 – 4.0 × 10³ poise
Tensile yield strength = 400 kg/cm²
Elongation at break = 15%
Izod impact strength = 22 kg.cm/cm notch

CONTROL EXAMPLE 3

The same polybutadiene rubber latex (FRS-2004) as in Example 1 without grafting was extracted with styrene-acrylonitrile monomer according to the following formulation:

| MATERIAL CHARGED INTO EXTRACTION VESSEL | CHARGED AMOUNT (parts) |
| --- | --- |
| Polybutadiene latex (solid portion) | 20 |
| Acrylonitrile | 24 |
| Styrene | 56 |
| Magnesium sulfate | 3 |

The components were mixed with stirring, and subjected to centrifugal separation, and the white turbid water was separated in the lower layer.

0.5 part of azobisisobutyronitrile and 0.2 part of the upper layer, and the solution was polymerized at 50° C in a glass reaction vessel for 24 hours.

Along with the progress of the polymerization, the uniformly white turbid homogeneous polymerization system started to change into two separated phases and the other resin phase showing the aggregation of rubber particles, and when the polymerization was terminated the rubber was completely separated from the styreneacrylonitrile copolymer phase.

It was impossible to produce the desired resin in which the rubber and resin were uniformly dispersed.

CONTROL EXAMPLE 4

200 parts by weight of styrene were added to 100 parts by weight of the solid portion of the polybutadiene latex which was used in Example 1 (produced by Firestone Co., Ltd. FRS-2004, the average particle size thereof being 0.25μ), and after sufficiently stirring the mixture, 1.5 parts by weight of sodium chloride were added in solid form.

Shortly thereafter water was separated, and dehydration was carried out by means by settling and centrifugal separation, and thereafter 80 parts by weight of styrene, 120 parts by weight of acrylonitrile, and 0.2 part of tert-dodecylmercaptan were added, and after having sufficiently stirred the mixture, and resulting solution of monomer, in which rubber particles were dispersed, was observed. It was found that several rubber particles were merged together.

The dispersion solution thus obtained was subjected to thermal mass polymerization, and a white polymer was obtained.

Observation by an electron microscope and an optical microscope shows that the rubber particles were remarkably large, which means that the rubbery polymer particles are aggregated and not dispersed uniformly and independently.

CONTROL EXAMPLE 5

Styrene/acrylonitrile (70/30) unsaturated monomers were added to 100 parts by weight of the solid portion of the emulsified polymer latex obtained in Example 1 (the concentration of the solid portion being 38.2%) in accordance with the formulation as is shown in Table 1, and the mixture obtained was stirred.

3 parts by weight of magnesium sulfate were added, and the separated water was removed, and the dehydration efficiency in accordance with the amount of unsaturated monomer were compared as in Table 1.

Table 1

| Run | Unsaturated Monomer | Dehydration Efficiency |
|---|---|---|
| A | 18 | 47 |
| B | 25 | 52 |
| C | 100 | 68 |
| D | 200 | 67 |
| E | 300 | 67 |
| F | 400 | 61 |
| G | 500 | 43 |

In regard to Run F, 4 parts by weight of magnesium sulfate were used, and in regard to Run G, 6 parts by weight of magnesium sulfate were used.

$$\text{Dehydration efficiency} = \frac{\text{Separated water}}{\text{Water contained in latex}} \times 100 \ (\%)$$

EXAMPLE 5

Styrene and acrylonitrile were graft polymerized onto the copolymer latex of butadiene-acrylonitrile (75/25) in accordance with the following formulation:

| MATERIALS | CHARGED AMOUNT (parts) |
|---|---|
| Butadiene-acrylonitrile copolymer latex (particle size 0.2μ) (solid portion) | 70.0 |
| Styrene | 21.0 |
| Acrylonitrile | 9.0 |
| Potassium persulfate | 0.5 |
| n-octylmercaptan | 0.2 |
| Sodium laurate | 0.8 |
| Deionized water | 150.0 |
| Polymerization temperature | 65°C |
| Polymerization time | 5 hours |

The conversion was 93%.

100 parts of styrene were mixed along with 100 parts of the solid portion of the grafted rubber polymer latex, and, after stirring the mixture, 2.0 parts of calcium chloride were added thereto and the separated water was removed.

Thereafter, 86 parts by weight of styrene, 101 parts by weight of acrylonitrile, and 0.65 part by weight of dodecylmercaptan were added thereto and after having mixed same thoroughly, the mixture obtained was subjected to thermal mass polymerization in the same manner as in Example 2.

Thereafter, 1.0 part by weight of phenol type stabilizer was added to the resulting polymer, and the physical properties of the polymer were examined. It was found that the polymer had the following excellent properties:

| Melt viscosity | $6.0 \times 10^3$ poise |
| Tensile yield strength | 443 kg/cm$^2$ |
| Elongation at break | 11% |
| Izod impact strength | 19.3 kg. cm/cm notch |

EXAMPLE 6

70 parts by weight of the solid portion of polybutadiene latex (the particle size thereof was approximately 0.25μ, and the solid portion of latex was 60%), 21 parts by weight of styrene, and 9 parts by weight of acrylonitrile were subjected to emulsion polymerization in accordance with the following formulation and a grafted rubber polymer latex was obtained.

| MATERIALS | CHARGED AMOUNT (parts) |
|---|---|
| Polybutadiene latex (solid portion) | 70.0 |
| Styrene | 21.0 |
| Acrylonitrile | 9.0 |
| Potassium persulfate | 0.3 |
| Disportionated rosin soap | 0.5 |
| Ion exchange water | 180.0 |

The grafted rubber polymer latex thus obtained was charged into a mixer provided with a biaxial stirrer, and then styrene monomer was charged thereto, followed by mixing.

Thereafter, an aqueous solution of magnesium sulfate was added thereto and the stirring operation of the mixture was carried out for 10 to 30 minutes.

Along with the stirring operation, polymer was extracted by monomer, and it was a crumb-like material, and the water contained in the latex was separated. The water and crumb were separated by means of a centrifugal separator, and the crumb alone was recovered.

The formulation adopted in the above mentioned extraction was as follows:

| MATERIALS | CHARGED AMOUNT (parts) |
|---|---|
| Grafted rubber polymer latex (solid portion) | 100 |
| Styrene | 150 |
| Aqueous solution of magnesium sulfate (10% solution) | 10 |

Styrene, acrylonitrile and tert-dodecylmercaptan were added to the crumb thus obtained, and mixed uniformly, and a viscous product of the following composition was obtained:

| MATERIALS | STRUCTURE (parts) |
|---|---|
| Grafted polymer | 23.0 |
| Styrene | 54.0 |
| Acrylonitrile | 23.0 |
| Tert-dodecylmercaptan | 0.2 |

The polymerization was carried out in the following manner:

The viscous material to be polymerized was charged into a pressure proof autoclave equipped with a stirrer, and the vapor phase of the autoclave was purged with $N_2$ gas, and $N_2$ gas was removed and replaced by monomer gas.

After having completely removed the air inside the reaction system the temperature of the autoclave was raised, and it was kept at 100° C for 10 hours, and thermal polymerization was carried out without using a catalyst.

After 10 hours, the temperature of the autoclave was raised to 200° C in 1 hour, and then kept at 200° C for 0.5 hour, and the polymerization was terminated.

The resulting polymer was extruded in gut form in the molten state, and the polymer obtained was cut into pellets.

The mechanical properties of the polymer were examined by injection molded test pieces in accordance with the ASTM method and the relation between the results and the method for charging the raw material are given in Table 2.

The mixture of 70% by weight of styrene and 30% by weight of acrylonitrile containing no rubber was charged into an autoclave before the raw material for polymerization was charged, and polymerization was first initiated by using a styrene-acrylonitrile mixture alone, and thereafter, when it reached an appropriate conversion, the raw material containing the above mentioned grafted rubber polymer particles was charged into the autoclave by adding the raw material into more than one step and the polymerization was carried out to produce the polymer.

The polymerization temperature was the same as Example 6.

The mechanical properties of the polymer thus obtained were examined by injection molded test pieces in accordance with the ASTM procedure, as in Example 6.

The mechanical properties of the resin obtained and the polymerization conditions are given in Table 3.

The main components of the resins of this example finally obtained are as follows:

Table 2

Condition for charging raw material and the mechanical properties of resin

| Run No. | Condition of polymerization | | | | Mechanical properties of resin | | | | |
|---|---|---|---|---|---|---|---|---|---|
| | Amount of charged raw material in the primary state of polymerization (parts) | Amount of raw material charged 4 hours after the start of polymerization (parts) | Amount of raw material charged 8 hours after the start of polymerization (parts) | Amount of raw material charged 12 hours after the start of polymerization (parts) | Melt viscosity ($\times 10^3$ poise) | Izod impact strength (kg.cm/cm notch) | Tensile yield strength (kg/cm$^2$) | Tensile break strength (kg/cm$^2$) | Elongation at break (%) |
| 1-1 | 100 | — | — | — | 4.5 | 16.5 | 365 | 340 | 14 |
| 1-2 | 70 | 30 | — | — | 4.1 | 21.3 | 370 | 335 | 16 |
| 1-3 | 50 | 25 | 25 | — | 4.3 | 26.8 | 380 | 330 | 15 |
| 1-4 | 30 | 30 | 40 | — | 3.8 | 28.2 | 385 | 340 | 12 |
| 1-5 | 20 | 20 | 20 | 40 | 3.8 | 25.6 | 375 | 330 | 10 |
| 1-6 | 20 | — | 40 | 40 | 4.5 | 24.8 | 380 | 345 | 13 |
| 1-7 | 40 | — | 60 | — | 3.7 | 30.2 | 385 | 340 | 12 |
| 1-8 | 60 | — | 40 | — | 3.5 | 32.8 | 390 | 340 | 16 |
| 1-9 | 50 | — | 25 | 25 | 3.2 | 29.6 | 400 | 350 | 18 |

EXAMPLE 7

The raw material, i.e. the grafted rubber polymer particle dispersed monomer solution prepared in Example 6 was used to carry out the following polymerization.

STRUCTURE OF RESIN

| MATERIALS | PARTS |
|---|---|
| Polybutadiene | 10 |
| Styrene | 63 |
| Acrylonitrile | 27 |

Table 3

Relation between the condition for charging raw material and mechanical properties of resin

| Run No. | Condition of polymerization | | | Mechanical properties of resin | | | | |
|---|---|---|---|---|---|---|---|---|
| | Amount of styrene-acrylonitrile charged in primary stage of a polymerization (parts) | Amount of raw material charged 5 hours after start of polymerization (parts) | Amount of raw material charged 10 hours after start of polymerization (parts) | Melt viscosity ($\times 10^3$ poise) | Izod impact strength (kg.cm/cm notch) | Tensile yield strength (kg/cm$^2$) | Tensile break strength (kg/cm$^2$) | Elongation at break (%) |
| 2-1 | 37.5 | 52.5 | 10.0 | 3.8 | 8.7 | 510 | 460 | 13 |
| 2-2 | 37.5 | 37.5 | 25.0 | 3.5 | 12.3 | 505 | 435 | 12 |
| 2-3 | 37.5 | 32.5 | 30.0 | 3.2 | 14.0 | 500 | 440 | 10 |
| 2-4 | 37.5 | 20.0 | 42.5 | 3.8 | 11.5 | 495 | 450 | 11 |
| 2-5 | 37.5 | 10.0 | 52.5 | 4.0 | 12.5 | 500 | 440 | 12 |
| 2-6 | 37.5 | — | 62.5 | 4.3 | 10.0 | 490 | 435 | 10 |
| 2-7* | 37.5 | — | — | 4.2 | 4.8 | 485 | 445 | 9 |

*37.5 parts by weight of styrene-acrylonitrile were uniformly mixed with 62.5 parts by weight of the raw material and the mixture obtained was charged before pooymerization was initiated.

EXAMPLE 8

Styrene-methyl methacrylate-acrylonitrile was emulsion graft polymerized onto the polybutadiene latex (whose particle size was $0.25\mu$, the latex solid portion thereof being 60%) in accordance with the following formulation:

| MATERIALS | CHARGED AMOUNT (parts) |
|---|---|
| Polybutadiene (solid portion) | 70.0 |
| Styrene | 6.6 |
| Acrylonitrile | 1.2 |
| Methyl methacrylate | 21.6 |
| Dextrose | 0.5 |
| Sodium pyrophosate | 0.3 |
| Cumenehydroperoxide | 0.2 |
| Ferrous sulphite | |
| Tert-dodecylmercaptan | 0.1 |
| Ion exchange water | 180.0 |

The polymerization was carried out to completion at 65° C under gaseous atmosphere.

Styrene and methyl methacrylate were mixed with the obtained grafted rubber polymer latex in accordance with the following formulation. Thereafter, acetic acid was added thereto and the mixture obtained was stirred for 20 minutes.

The grafted rubber polymer was extracted into the monomer in a crumb-like state, and it was separated from the water which came from the latex. The water was separated by means of centrifugal separation, and the crumb was mixed in methyl methacrylate and acrylonitrile, and a raw material for polymerization having the following composition was obtained.

| EXTRACTED MATERIAL MATERIALS | CHARGED AMOUNT (parts) |
|---|---|
| Grafted rubber polymer latex (solid portion) | 100 |
| Styrene | 115 |
| Methyl methacrylate | 35 |
| Acetic acid | 2.5 |

Table 4

| COMPOSITION OF RAW MATERIAL FOR POLYMERIZATION | |
|---|---|
| MATERIALS | CHARGED AMOUNT (parts) |
| polybutadiene | 15.0 |
| Graft polymer (resin portion) | 6.4 |
| Styrene | 17.5 |
| Methyl methacrylate | 57.2 |
| Acrylonitrile | 3.9 |
| Water | 9.0 |

The following polymerization was carried out by using the above identified raw material (dope).

The dope was charged into an autoclave. While stirring the dope, polymerization was carried out at 100° C for 8 hours, and then the temperature of the polymerization system was raised as high as 200° C in 3 hours, and the polymerization system was kept at 200° C for 0.5 hour to complete the polymerization.

During the polymerization, monomer and water were evaporated out from the polymerization system to be condensed, water alone was removed from the reaction system, monomer alone was pumped back to the autoclave, and the water in the reaction system was removed.

On the other hand, in carrying out the polymerization, in regard to Sample A, the entire batch of the dope was charged into the autoclave from the beginning of the polymerization, and in regard to Sample B, 40 parts by weight of the entire batch of the dope was charged into the autoclave in the primary stage of the polymerization, and 60 parts by weight of the remaining portion was charged on the fifth hour after the start of the polymerization.

The polymers obtained were white beautiful resins, and 0.5 part by weight of styrenated phenol and 0.5 part by weight of calcium stearate were added to them, and their physical properties were examined, and are given in the following table:

| | Sample A | Sample B |
|---|---|---|
| Tensile strength at yield ($kg/cm^2$) | 365 | 380 |
| Tensile strength at break ($kg/cm^2$) | 340 | 335 |
| Elongation at yield (%) | 4.5 | 4.0 |
| Elongation at break (%) | 16 | 14 |
| Izod impact strength (kg.cm/cm notch) | 10 | 18 |
| Light permeability (%) | 86 | 89 |

CONTROL EXAMPLE 6

This is a control example which was conducted to show the difference, viewed technically, between the end product produced by a process using a non-grafted rubber latex and by a process using grafted rubber latex. When a non-grafted rubber latex is used as a base rubber latex, the surface gloss of the end product becomes quite poor. Surface gloss is quite an essential quality for an ABS resin.

To 18 parts by weight of the solid portion of a rubber latex, which is the same latex used in Example 1 (Firestone Co., Ltd. FRS-2004, average particle size $0.25\mu$), are added 56.5 parts by weight of styrene and 24.5 parts by weight of acrylonitrile. The mixture thus obtained was stirred for 20 minutes. Thereafter, 3 parts by weight of magnesium surface were added and stirred for fifteen minutes. Thirty minutes after termination of the stirring, the mixture was divided into layers, the upper layer consisting of rubber polymer and monomers and the lower layer consisting of water.

The water in the lower layer was removed, and 0.2 parts by weight of tert-dodecylmercaptan and 0.3 part of azobisisobutyronitrile were added to the rubber polymer-monomer mixture layer. The mixture was uniformly mixed and the resulting mixture was charged into a glass vessel. The vapor phase in the vessel was replaced with nitrogen gas, and then the mixture was subjected to polymerization at 50°C for 24 hours. The polymerization was terminated.

The polymer was recovered from the glass vessel. It was a white opaque polymer. It was crushed and 1% by weight of a phenol type stabilizer based on the amount of the polymer was added.

The resulting product was injection molded, and its physical properties were examined. These properties were as follows:

Melt viscosity (220°C 0.5 mm × 1 mm nozzle 50 $kg/cm^2$) = $4.5 \times 10^3$ poise
Tensile yield strength = 385 $kg/cm^2$
Elongation at break = 16%
Izod impact strength = 18 kg/cm/cm notch
Surface gloss = 30%

The surface gloss of the polymer product was quite poor compared with the polymer obtained in Example 1. Moreover, its other physical properties were poor compared with the polymer obtained in Example 1.

The surface gloss in Control Example 6 was measured by the surface gloss meter (Murakami Coloring Technology Laboratory Inc. — Type GM - 3). Measurements were made in the same way, of products of other examples in this specification, with the following results:

Example 1
 Surface gloss = 95%
   Example 2                  Surface gloss
     No. 1                       94%
     No. 2                       96%
     No. 3                      100%
     No. 4                       95%
Example 4
 Surface gloss = 95%
Example 5
 Surface gloss = 90%
   Example 6                  Surface gloss
     1–1                         92%
     1–2                         95%
     1–3                         95%
     1–4                         90%
     1–5                         93%
     1–6                         93%
     1–7                         94%
     1–8                         93%
     1–9                         95%

Example 7                  Surface gloss
     2–1                         90%
     2–2                         95%
     2–3                         95%
     2–4                         95%
     2–5                         90%
     2–6                         93%
     2–7                         85%
Example 8         Sample A        Sample B
 Surface gloss     90%              95%

EXAMPLE 9

In still another example of this invention, rubbery polymer latices, the compositions of which are described in Table 5, were prepared in accordance with the following formula:

Polymerization recipe
Ingredients
Polybutadiene latex
 (Particle size = 0.25μ, gel content 75%) } 100
Styrene
Acrylonitrile
Sodium laurate                             0.5
Potassium persulfate                       0.3
Deionized water                            150

Polymerization was carried out under nitrogen atmosphere at a temperature of 65°C, and after 6 hours of reaction the reactor was cooled to obtain the rubbery polymer latice. The polymers in these latices were found to have the glass transition temperatures as indicated in Table 5.

Table 5

| Run No. | Polybutadiene | Styrene | Acrylonitrile | Glass transition temperature of the rubbery polymer |
|---|---|---|---|---|
| 1 | 100 | 0 | 0 | −80°C |
| 2 | 90 | 7 | 3 | −65°C |
| 3 | 80 | 14 | 6 | −45°C |
| 4 | 70 | 21 | 9 | −30°C |
| 5 | 60 | 28 | 12 | −16°C |
| 6 | 50 | 35 | 15 | 0°C |
| 7 | 30 | 49 | 21 | 30°C |
| 8 | 20 | 56 | 24 | 45°C |

112.5 parts by weight of each latex was mixed with 166 parts by weight of acrylonitrile and 1.2 parts by weight of magnesium sulfate and stirred for 30 minutes.

The mixture was separated into two layers after stirring was ceased; the upper layer was rubbery polymer latex particle dispersed monomer solution, the under layer was water. The water was discarded to obtain a white milky monomer dispersion. To 100 parts by weight of the rubbery polymer particle dispersed monomer solution, 0.2 parts by weight of tertdodecyl-mercaptan was added and the mixture was polymerized under the same conditions as in Example 2. The polymer thus obtained was tested to measure its physical properties.

These measured properties were as shown in Table 6.

Table 6

| Run No. | Glass transition temp. of the rubbery polymer (°C) | Izod impact strength (Kg.cm/cm notch) | Tensile Yield Strength (KG/cm²) | Tensile Elongation at break (%) | Surface Gloss (%) |
|---|---|---|---|---|---|
| 1 | −80 | 22 | 360 | 42 | 30 |
| 2 | −65 | 32 | 390 | 37 | 86 |
| 3 | −45 | 24 | 410 | 21 | 92 |
| 4 | −30 | 18 | 430 | 17 | 95 |
| 5 | −16 | 15 | 440 | 18 | 96 |
| 6 | − 0 | 10 | 485 | 12 | 90 |
| 7 | 30 | 5 | 510 | 8 | 85 |
| 8 | 45 | 3 | 530 | 7 | 86 |

The data indicated in Table 6 shows the non-obvious result that with a latex, of which the glass transition temperature is above 0°C (Runs 7 and 8), the impact strength of the finished product resin (which is the one of the essential objects of the instant invention) is quite small, and that with an ungrafted rubber polymer latex (Run 1), the surface gloss of the finished product resin (which is the other essential object of the instant invention), is quite poor.

The following is claimed:
1. Method for producing impact resistant rubber modified thermoplastic resin containing from about 5 to 35% by weight of rubber component comprising
   a. in a first process step, emulsion graft polymerizing 5 to 40 parts by weight of at least one unsaturated monomer which is selected from the group consisting of unsaturated monomers represented by the general formula wherein $R_1$ is —H or —$CH_3$, $R_2$ is selected from the group consisting of —H, alkyl group in the range of $C_1$ — $C_3$, and —Cl, wherein $R_3$ is —H, or —CH$_3$, and wherein $R_4$ is —H, or —CH$_3$, $R_5$ is —H, or an alkyl group in the range of $C_1$ - $C_5$, with 95 to 60 parts by weight of a latex polymer obtained by homopolymerization or copolymerization of conjugated diene monomer, of which the glass transition temperature is below 0°C;

b. in a second process step, mixing the grafted rubber polymer latex obtained from the first process step with about 50 to 400 parts by weight based on 100 parts by weight of grafted polymer, of at least one unsaturated monomer, which is selected from the above described group, and extracting the rubber polymer particles from said latex into said monomer to obtain two phases, one such phase being a monomer phase in which said grafted rubber polymer particles are dispersed without changing substantially the particle size in latex, and the other being a water phase, then removing said water phase; and c. in a third process step, bulk polymerizing the grafted rubber polymer particle dispersed monomer solution.

2. Method according to claim 1 wherein said latex polymer has a glass transition temperature below 0°C, obtained by homopolymerizing or copolymerizing the conjugated diene monomer, and is a polymer comprising a monomer component of more than about 60% by weight of conjugated diene monomer selected from the group of monomers represented by the following general formula wherein R is —H, —CH, —Cl and of less than 40% by weight of one or two monomers selected from the group consisting of styrene, acrylonitrile and methyl methacrylate.

3. Method according to claim 1, wherein the graft polymerization of the first process step is carried out by using about 95 to 60 parts by weight of latex rubber polymer and about 5 to 40 parts by weight of said unsaturated monomer.

4. Method according to claim 1, wherein the particle size of the rubber polymer in latex is above about 0.1 micron.

5. Method according to claim 1, wherein the gel content of the rubber polymer in latex is more than about 30% by weight.

6. Method according to claim 1, wherein in the second process step from about 50 to 400 parts by weight of said unsaturated monomer is used for extraction based on 100 parts by weight of grafted rubber polymer, and thereafter the rubber polymer particles are extracted into the said monomer to obtain the grafted rubber polymer particle dispersed monomer solution.

7. Method according to claim 1, wherein in the second process step styrene is used for extraction of the rubber polymer particles and the water is separated and removed to obtain the rubber polymer particle dispersed styrene solution, and thereafter the above styrene solution is diluted by other unsaturated monomers before subjecting to bulk polymerization.

* * * * *